United States Patent
Vireday et al.

(10) Patent No.: US 7,286,848 B2
(45) Date of Patent: Oct. 23, 2007

(54) METHOD AND APPARATUS TO PROVIDE TIERED WIRELESS NETWORK ACCESS

(76) Inventors: Richard P Vireday, 2678 NE. Lindsey Dr., Hillsboro, OR (US) 97124; Robert P Frisbee, 3849 SE. 40th Ave., Portland, OR (US) 97202

( * ) Notice: Subject to any disclaimer, the term of this patent is extended or adjusted under 35 U.S.C. 154(b) by 346 days.

(21) Appl. No.: 10/881,906

(22) Filed: Jun. 30, 2004

(65) Prior Publication Data

US 2006/0003796 A1    Jan. 5, 2006

(51) Int. Cl.
*H04M 1/00* (2006.01)
*H04M 1/66* (2006.01)
*H04B 1/38* (2006.01)

(52) U.S. Cl. .................. 455/550.1; 455/410; 455/411; 455/556.2; 455/561

(58) Field of Classification Search .. 455/554.1–554.2, 455/453–454, 41.2, 500, 507–517, 524–525, 455/66.1, 560–561, 432.1–432.3, 410–411, 455/412.1, 412.2, 414.1, 415, 418–419, 420, 455/462, 433–434, 435.1–435.3, 436–451, 455/452.1, 452.2, 455, 464, 557, 550.1, 556.2; 370/395.5, 395.53, 328–350, 908–916; 380/247–250, 380/241; 713/160–179
See application file for complete search history.

(56) References Cited

U.S. PATENT DOCUMENTS

| | | | |
|---|---|---|---|
| 6,834,341 B1 * | 12/2004 | Bahl et al. | 713/156 |
| 6,892,201 B2 * | 5/2005 | Brown et al. | 707/9 |
| 6,970,027 B2 * | 11/2005 | Park et al. | 327/156 |
| 7,082,320 B2 * | 7/2006 | Kattukaran et al. | 455/562.1 |
| 2002/0022483 A1 * | 2/2002 | Thompson et al. | 455/439 |
| 2004/0081180 A1 * | 4/2004 | De Silva et al. | 370/402 |
| 2004/0100973 A1 * | 5/2004 | Prasad | 370/401 |
| 2004/0199604 A1 * | 10/2004 | Dobbins et al. | 709/217 |
| 2004/0249915 A1 * | 12/2004 | Russell | 709/223 |
| 2004/0260760 A1 * | 12/2004 | Curnyn | 709/20 |
| 2005/0036465 A1 * | 2/2005 | Waxman et al. | 370/338 |
| 2005/0055570 A1 * | 3/2005 | Kwan et al. | 713/201 |
| 2005/0156794 A1 * | 7/2005 | Theobold et al. | 343/702 |
| 2005/0226175 A1 * | 10/2005 | Gupta et al. | 370/310 |

* cited by examiner

*Primary Examiner*—Meless Zewdu
(74) *Attorney, Agent, or Firm*—The Law Offices of John C. Scott, LLC; John C. Scott

(57) ABSTRACT

A tiered wireless access point has a number of different network access levels that may be provided to wireless devices seeking network access. The network access levels may differ from one another in factors such as the particular networks that may be accessed, the security level of the network connection, and/or the speed of the connection.

17 Claims, 4 Drawing Sheets

METHOD AND APPARATUS TO PROVIDE TIERED WIRELESS NETWORK ACCESS

TECHNICAL FIELD

The invention relates generally to wireless communications and, more particularly, to wireless networking.

DETAILED DESCRIPTION

Figure 1:
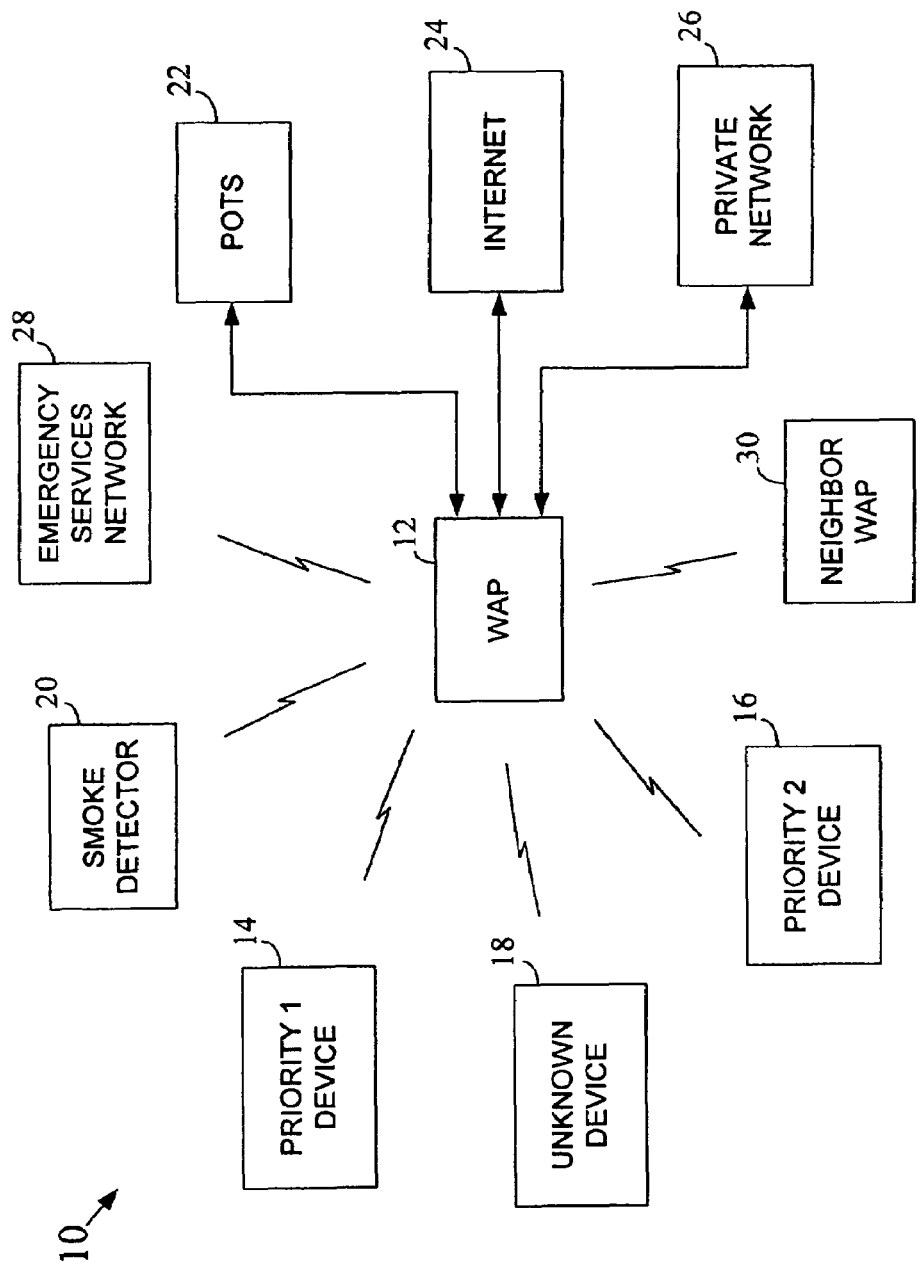
FIG. 1 is a block diagram illustrating an example tiered wireless access point operational scenario in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating an example tiered wireless access point operational scenario 10 in accordance with an embodiment of the present invention. As illustrated, a tiered wireless access point 12 is providing wireless network access for a plurality of remote wireless devices 14, 16, 18, 20. The tiered wireless access point 12 is in wired communication with one or more wired networks. For example, in the illustrated embodiment, the tiered wireless access point 12 is coupled to a telephone network 22 providing plain old telephone service (POTS), the Internet 24, and a secured private network 26 (e.g., a corporate local area network (LAN), etc.). The tiered wireless access point 12 is capable of providing a different level or tier of network access to different wireless devices communicating therewith. For example, with reference to FIG. 1, for a priority 1 wireless device 14, the tiered wireless access point 12 may provide access to the telephone network 22, the Internet 24, and the secured private network 26. For a priority 2 wireless device 16, the tiered wireless access point 12 may only provide access to the Internet 24 and the telephone network 22. For an unknown user device 18, the tiered wireless access point 12 may only provide access to the Internet 24 or some other default network access. Other possible default access types may include, for example, intranet access only, Internet and intranet access only, neighbor WAP access only, denied access, and others (including combinations of the above).

The scenario 10 of FIG. 1 may occur, for example, within a corporate building. The priority 1 device 14 may be associated with a corporate manager that has authorization to use a secured corporate network. The priority 2 device 16 may be associated with a corporate employee that has authorization to use the corporate telephone system, but is not authorized to access the corporate network. The unknown device 18 may belong to a visitor within the corporate building (e.g., a vendor having a meeting with corporate employees, etc.) that does not have authorization to access the corporate network or the telephone system. The corporation, however, has decided to provide wireless Internet access to visitors as a courtesy (i.e., a default access level). As will be appreciated, many alternative scenarios are also possible. Any number of different access levels may be defined in accordance with the invention.

In addition to (or as an alternative to) limiting the types of networks or network portions that may be accessed by individual wireless devices, the tiered wireless access point 12 may also be capable of limiting the speed of the access or the security level of the access. Thus, one wireless access level may provide full speed Internet access while another, for example, provides only half speed Internet access. Some remote wireless devices may also be given priority over others for bandwidth utilization. For example, referring to FIG. 1, a smoke detector 20 having wireless capability may send a signal to the tiered wireless access point 12 indicating that smoke has been detected and that emergency services needs to be notified. This type of communication may be given priority over other types of communication (such as, for example, device to device communication, Internet searching, etc.). Similarly, the default network access level (if any) provided to unknown devices may be given minimal priority (e.g., only provided when bandwidth is not being used by known devices). Default access may also be limited by network security policies.

In at least one embodiment, the tiered wireless access point 12 is capable of communicating with other tiered wireless access points 30 in a vicinity thereof. In this manner, a network of wireless access points may be configured to provide an alternative medium of communication. For example, in remote regions, communication pathways may be established through a grid of wireless access points in a building to building arrangement. Access to such a communication medium may also be controlled by the access level provided an individual wireless device. Communication between wireless access points may be wireless or wired. In at least one implementation, a dedicated communication link (wired or wireless) to an emergency services network 28 may also be established from the tiered wireless access point 12. In an alternative implementation, an access point to access point communication grid may be established for emergency services purposes (e.g., within a remote area, etc.).

Any type of wireless device may be permitted to communicate through a tiered wireless access point. Wireless devices may include, for example, laptop, desktop, palmtop, and tablet computers having wireless networking capability, personal digital assistants (PDAs) having wireless networking capability, cellular telephones or other handheld wireless communicators, pagers, wireless computer peripherals, emergency detection devices having wireless communication capability (e.g., smoke alarms, fire alarms, burglar alarms, etc.), utility meters having wireless communication capability, audio/visual devices having wireless communication capability, and/or others. To communicate through the tiered access point, however, a wireless device must use a wireless technology that is supported by the access point.

Figure 2:
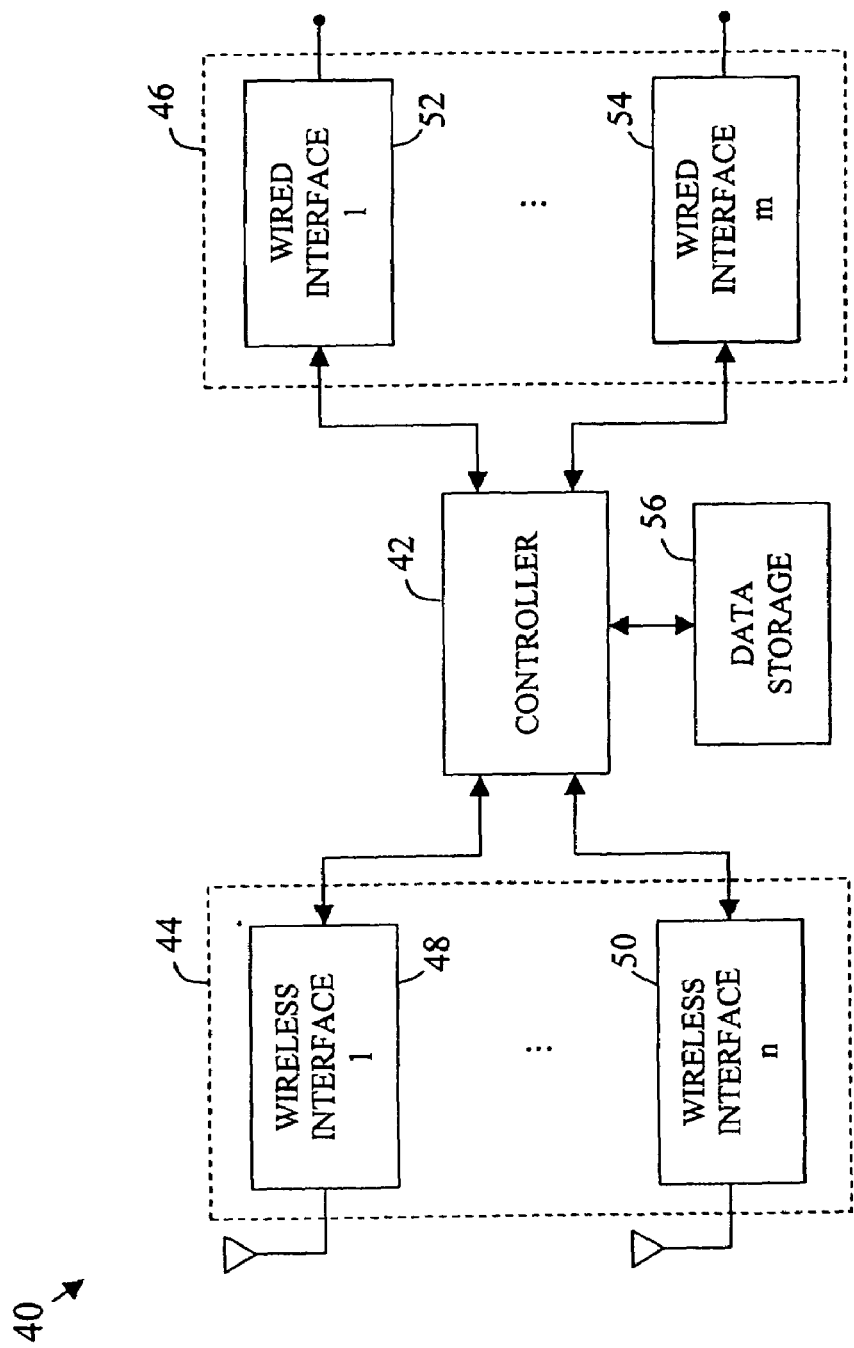
FIG. 2 is a block diagram illustrating an example tiered wireless access point in accordance with an embodiment of the present invention.

FIG. 2 is a block diagram illustrating an example tiered wireless access point 40 in accordance with an embodiment of the present invention. As illustrated, the tiered wireless access point 40 may include: a controller 42 to manage communication through the wireless access point 40, a wireless input/output (I/O) unit 44 to support communication with wireless devices in the environment about the wireless access point 40, a wired I/O unit 46 to support communication with one or more wired networks external to the wireless access point 40, and one or more data storage units 56. The wireless I/O unit 44 may include one or more wireless interface units 48, 50 (e.g., wireless transceivers, etc.) for supporting wireless links. Any number of different wireless technologies (one or more) may be supported by the tiered wireless access point 40. For example, a wireless interface may be provided for devices following any one or more of the following wireless protocols: IEEE 802.11, IEEE 802.15.3, Bluetooth, spread spectrum wireless communication, infrared wireless communication, cellular wireless standards (e.g., global system for mobile communication (GSM), general packet radio services (GPRS), etc.), and/or others (including future wireless technologies). In addition, one or more wireless interface devices may be provided to support communication with other wireless access points in the surrounding environment. The wireless I/O unit 44 may be coupled to one or more antennas to facilitate transmission of signals into and reception of signals from wireless channels. Any type of antenna may be used including, for example, dipoles, patches, helical antennas, antenna arrays, and/or others, including combinations of the above.

The tiered wireless access point 40 may be configured to communicate with one or more different types of wired network. Thus, in at least one embodiment, the wired I/O 46 may include one or more wired interface units 52, 54 to support communication with the external network(s). For example, the wireless I/O unit 46 may include a wired interface for one or more of the following network types: an Ethernet network, the Internet, a telephone network (POTS), an integrated services digital network (ISDN) basic rate interface (BRI), an ISDN primary rate interface (PRI), broadband ISDN, a fiber distributed data interface (FDDI), a synchronous optical network (SONET), a digital subscriber line (DSL) (which may include, for example, regular DSL, asymmetric DSL (ADSL), high bit rate DSL (HDSL), rate adaptive DSL (RADSL), and/or others), a frame relay network, an asynchronous transfer mode (ATM) network, a packet switching network, and/or others (including future wired network types). In some cases, the interface functionality may not be part of the tiered wireless access point 40 itself, but be located outside of the unit. For example, in at least one implementation, an I/O port (e.g., an Ethernet port, a universal serial bus (USB) port, a firewire port, etc.) is provided within the wired I/O 46 off the access point 40 for use in connecting to the Internet. An external cable modem or DSL modem may then be connected to the I/O port to provide the interface functionality to support high speed communication with the Internet. Interfaces for other types of wired networks may also be connected externally in a similar fashion.

In some embodiments, the tiered wireless access point 40 may have fixed capabilities. For example, the wireless access point 40 may only support predetermined wireless and/or wired technologies. In other embodiments, the tiered wireless access point 40 may be user expandable. For example, expansion ports may be provided within the wireless access point 40 that allow additional wireless interface functionality and/or wired interface functionality to be added by the end user. In one possible scenario, for example, an end user may decide that a wireless access point 40 needs to provide access to a SONET-based network. The end user may therefore add a SONET card to the wireless access point 40. In another scenario, an end user may decide that Bluetooth-enabled wireless devices should be able to obtain network access through a wireless access point 40. The end user may therefore add a Bluetooth card to the wireless access point 40, and so on. The tiered wireless access point 40 may or may not provide user programmability of access related functions. For example, in some embodiments, the wireless access point 40 may allow a user to define the different access levels while in other embodiments the access levels are predefined and fixed.

As described above, in one aspect of the present invention, a tiered wireless access point is provided that can grant different levels of network access to different devices requesting a network connection. The different access levels may vary from one another based on, for example, the specific networks that may be accessed, the security level of the connection, and/or the speed of the connection. In one approach, each wireless device that is attempting to gain access to a network via the tiered access point will have certain access rights associated with it. The wireless access point may determine those rights during, for example, a logon procedure. In at least one embodiment of the invention, the logon procedure is performed in a manner that is substantially transparent to the user associated with the device (if any).

With reference to FIG. 2, the controller 42 may manage the assignment of access levels to remote wireless devices for the tiered wireless access point 40. The controller 42 may be implemented using, for example, one or more digital processing devices. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others.

In at least one embodiment of the invention, each network access level may have one or more dedicated channels assigned to it. For example, in a system that uses the IEEE 802.11 wireless networking standard, channel 6 may be assigned to devices within a first access level (e.g., unknown devices), channel 8 may be assigned to devices in a second access level (e.g., priority 2 devices), channel 10 may be assigned to devices in a third access level (e.g., priority 1 devices), and channel 12 may be assigned to speak to other access points. In some other embodiments, a single channel may be used for all wireless devices. In an embodiment where multiple wireless technologies are supported by a tiered wireless access point, the access rights associated with a device may be related to the wireless technology that the wireless device is using to communicate with the access point. For example, in an access point that supports both IEEE 802.11g and Bluetooth, all devices communicating with the access point using Bluetooth technology may be assigned a particular access level. Devices using IEEE 802.11g, on the other hand, may have multiple different access levels associated with them. As will be appreciated, many alternative arrangements may also be used.

As illustrated in FIG. 2, in at least one embodiment, data storage 56 may be provided within, and/or be attached to, the tiered wireless access point 40. Any type of digital data storage may be used including, for example, one or more hard disk drives, one or more floppy disk drives, one or more flash memories or other forms of semiconductor memory, and/or others, including combinations of the above. The data storage may be used as, for example, a network cache, a network data storage depot (similar to, for example, network attached storage (NAS)), and/or for other uses. In one implementation, for example, the tiered wireless access point 40 may be used within a home network and the data storage 56 may be used as a home file server that can act as a NAS device for data backups. Many other uses also exist.

Figure 3:
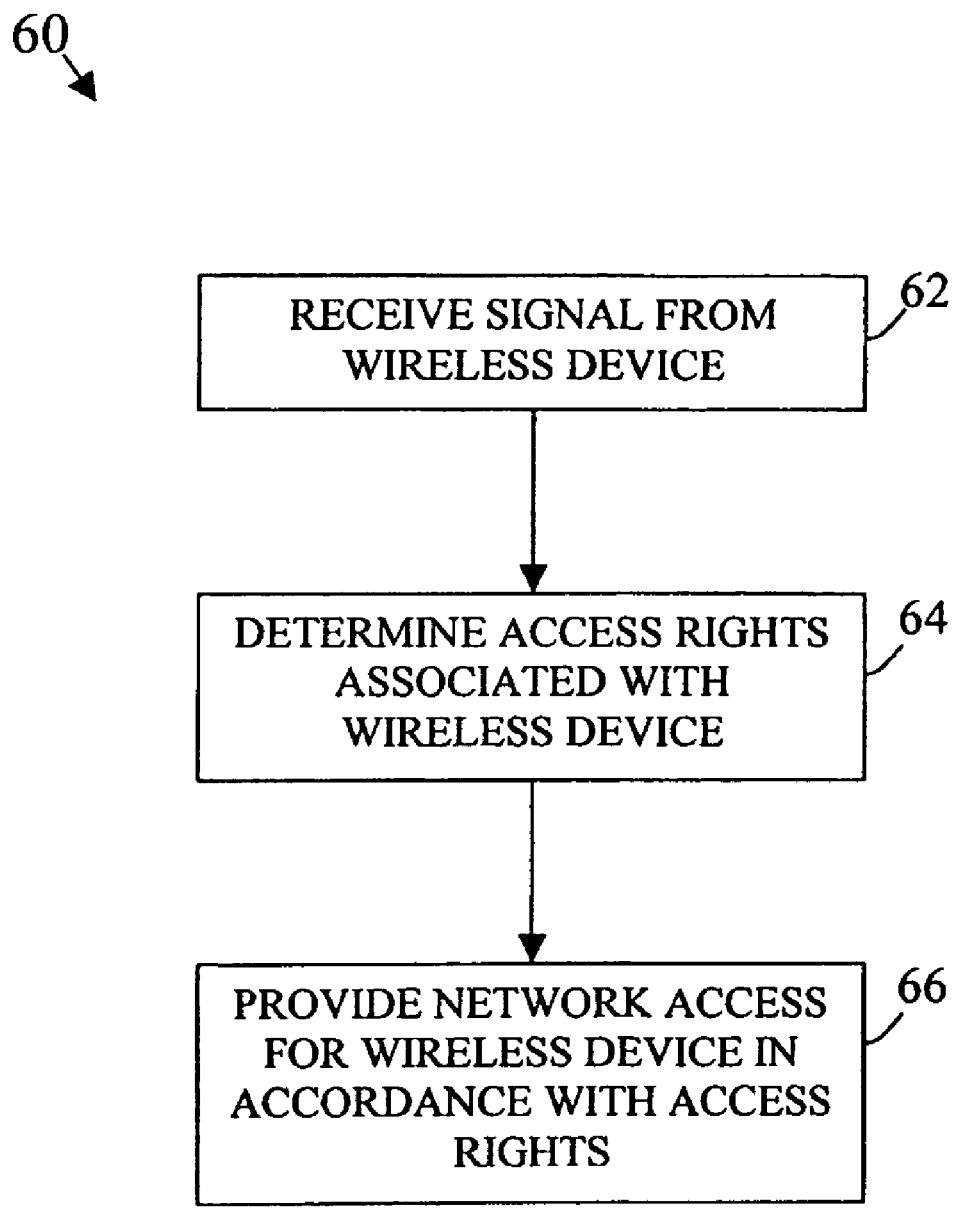
FIG. 3 is a flowchart illustrating an example method for use during a logon procedure in a tiered network in accordance with an embodiment of the present invention.

FIG. 3 is a flowchart illustrating an example method 60 for use during logon in a tiered wireless network in accordance with an embodiment of the present invention. A wireless access point first receives a signal from a wireless device indicating that network access is desired (block 62). The wireless access point then determines the access rights associated with the wireless device (block 64). The access rights may be determined in any of a variety of different ways. In one approach, the received signal will include information from which an identity of a user associated with the wireless device can be determined. Once the identity of the user has been authenticated, the wireless access point can retrieve information from a database that identifies the access rights (or the access level) associated with the user. In some embodiments, as described previously, the type of wireless technology being used by the wireless device may be used to determine the access rights associated with the wireless device. Other techniques for determining the access rights associated with a user may alternatively be used. Once the access rights associated with a user have been determined, the wireless access point may grant access to the wireless device in accordance with the access rights (block 66). As described above, this may be carried out by assigning one of a plurality of predefined access levels to the wireless device. Each of the different access levels may have a different combination of network type, speed, and/or security associated with it.

Figure 4:
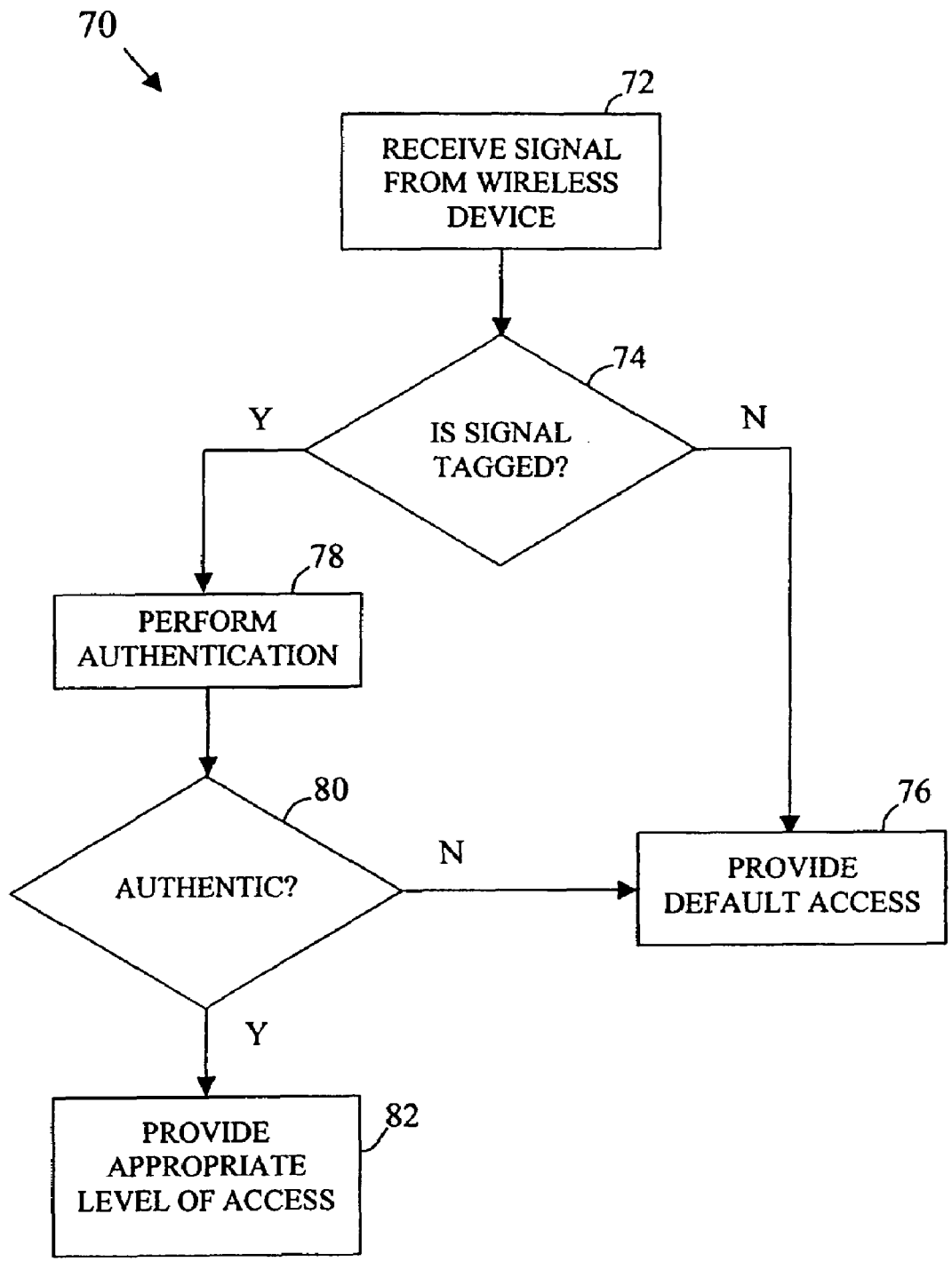
FIG. 4 is a flowchart illustrating another example method for use during a logon procedure in a tiered network in accordance with an embodiment of the present invention.

FIG. 4 is a flowchart illustrating another example method 70 for use during logon in a tiered wireless network in accordance with an embodiment of the present invention. A wireless access point first receives a signal from a wireless device indicating that network access is desired (block 72). The wireless access point then determines whether the signal is "tagged" (block 74). A signal "tag" is a portion of the signal that includes information indicating the network service or services that the wireless device desires. For example, a signal tag may indicate that voice over IP (VoIP) services are desired, or a device connection is desired, or a secured network connection is desired, etc. The signal tag may also include information identifying the corresponding wireless device, or the user associated with the device, and any security information that may be needed to provide the requested services. The tag may also include information identifying the particular channel that the wireless device wishes to use, the bandwidth that the device would like to be assigned, and/or other information indicating the type of connection the device is requesting. In at least one embodiment, the signal tag will be located within a signal header at the beginning of the signal, although other locations may alternatively be used.

If the wireless signal is not tagged, the wireless access point may provide a default level of network access for the wireless device (block 76). The default access level may include, for example, Internet access only, intranet access only, neighbor WAP access, denied access, or others. The default network access may be at a reduced speed and may also be provided only when appropriate bandwidth is available. Other types of default access may alternatively be provided (including no access for untagged devices).

If the signal received from the wireless device is tagged, the tiered wireless access point may perform an authentication procedure for the wireless device (block 78). During the authentication procedure, the wireless access point will attempt to determine whether the wireless device seeking access, or the user associated therewith, is the device (or user) that it claims to be. Any type of authentication process may be used. In at least one embodiment, security descriptors will be used for the top tiered wireless connections. For example, in one approach, secured packets with keys that roll in sequences may be used for virtual private network (VPN)-like security. Other wireless security techniques or protocols may alternatively be used. In at least one implementation, the authentication procedure will be relatively automatic and transparent to the user. In other implementations, user input may be required during the authentication process.

If the authentication process fails, the wireless access point may provide the default access level to the wireless device (blocks 80 and 76). If the authentication is successful, on the other hand, the wireless access point may provide network access in accordance with the access rights associated with the wireless device or user (block 82). If the wireless device or the user associated therewith does not have the rights to access the services requested within the tag, the wireless access point may send a message to the wireless device stating that the requested services are not available to the device.

Certain types of network access may require additional security measures to be taken before access is granted. For example, if access to a secure network has been requested, and the wireless access point has determined that a user associated with the wireless device has rights to access the secure network, the wireless access point may be capable of prompting the wireless device for more information before access is granted to make sure that the appropriate user is currently using the device. For example, the wireless access point may prompt the user to provide biometric information (e.g., touch a fingerprint scanner on the device, etc.), a security code, etc. that will allow further authentication to be performed.

As described previously, in at least one embodiment of the present invention, a tiered wireless access point is provided that is user configurable. That is, an end user of the wireless access point is able to configure the different access levels in accordance with their needs and applications. A user may determine, for example, what types of wired networks the access point will be coupled to, what types of wireless technologies will be supported, how many different access levels will be provided, how the access levels differ from one another (e.g., based on network type, security, and/or speed), what type of wireless security protocols will be used, what type of default access will be provided, etc.

Some examples of different implementations of a tiered wireless access point in accordance with the present invention follow. In a first scenario, a user connects a tiered wireless access point within his home with a cable modem connected for high speed Internet access. The user enables client devices with tokens for packets. The user also enables a public "911" emergency services level for use by the local neighborhood and a neighborhood mesh protocol layer that allows public access to the Internet. In another scenario, a user in a remote rural location may connect a tiered wireless access point within his home with a point to point wireless link to a tiered wireless access point at a neighbor's residence. Directional antennas may be used for the point to point link. The neighbor's access point may, in turn, be connected to another neighbor's wireless access point, and so on. In this manner, a grid may be established in remote regions. One of the residences may employ a cable modem or DSL connection to provide high speed Internet access that can be shared by the residences coupled to the grid.

In still another possible scenario, a series of wireless access points may be distributed along a power line route (or railroad, road, or other right of way) at regular intervals to provide, for example, telephone services within a rural area. Directional antennas may be used for the links between access points. User can then connect to a nearest access point when communication services are needed. In yet another possible scenario, an office building that houses a number of different businesses may provide wireless access points that may be used by the different businesses. In this manner, one or more high speed Internet connections may be shared by the corresponding businesses. Each business may desire to provide access to a corresponding secure corporate network for its employees. The businesses will want to prevent, however, non-employees from accessing their private networks. The tiered wireless access points may be configured to provide the desired access levels to the appropriate parties. The office building may also provide, for example, free Internet access or emergency services access to the public. In yet another possible scenario, a network of wireless access points may be established for use as an emergency grid. A fire detector within a building housing one of the wireless access points may then notify a call center in an alarm company over the emergency grid to report a fire. The call center can then notify local emergency services as to the reported fire. As will be appreciated, a wide variety of other scenarios are also possible.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
receiving a wireless signal from a remote wireless device attempting to gain network access;
determining whether said wireless signal is tagged with a tag identifying a desired network service;
when said wireless signal is not tagged, providing a default network access level to said remote wireless device; and
when said wireless signal is tagged:
performing an authentication procedure for said remote wireless device; and
when said remote wireless device is determined to be authentic, providing one of a number of network access levels to said remote wireless device based on access rights associated with said remote wireless device.

2. The method of claim 1, further comprising:
when said remote wireless device is determined to not be authentic, providing said default network access level to said remote wireless device.

3. The method of claim 1, wherein:
said default network access level provides at least one of the following: Internet access only, intranet access only, Internet and intranet access only, access to a neighbor wireless access point only, and denied access.

4. The method of claim 3, wherein:
said default network access level provides access at less than a maximum possible speed.

5. The method of claim 1, wherein:
said default network access level has a lower priority than said other network access levels.

6. The method of claim 1, wherein:
performing an authentication procedure for said remote wireless device includes determining whether said remote wireless device is the device it claims to be.

7. The method of claim 1, wherein:
said authentication procedure is performed in a manner that is substantially transparent to a user of said remote wireless device.

8. A wireless access point (AP) comprising:
at least one wireless interface device to support wireless communication with one or more remote wireless entities; and
a controller to control access to one or more networks coupled to said AP based on access rights of remote wireless devices seeking access, said controller to:
receive a wireless signal from a remote wireless device attempting to gain network access;
determine whether said wireless signal is tagged with a tag identifying a desired network service;
when said wireless signal is not tagged, provide a default network access level to said remote wireless device; and
when said wireless signal is tagged:
perform an authentication procedure for said remote wireless device; and
when said remote wireless device is determined to be authentic, provide one of a number of network access levels to said remote wireless device based on access rights associated with said remote wireless device.

9. The wireless AP of claim 8, wherein:
said controller is to provide said default network access level to said remote wireless device when said remote wireless device is determined to not be authentic.

10. The wireless AP of claim 8, wherein:
said default network access level provides at least one of the following: Internet access only, intranet access only, Internet and intranet access only, access to a neighbor wireless access point only, and denied access.

11. The wireless AP of claim 8, wherein:
said default network access level provides access at less than a maximum possible speed.

12. The wireless AP of claim 8, wherein:
said default network access level has a lower priority on a network medium than other network access levels.

13. An article comprising a computer readable storage medium having instructions stored thereon that, when executed by a computing device, operate to:
- receive a wireless signal from a remote wireless device attempting to gain network access;
- determine whether said wireless signal is tagged with a tag identifying a desired network service;
- when said wireless signal is not tagged, provide a default network access level to said remote wireless device; and
- when said wireless signal is tagged:
    - perform an authentication procedure for said remote wireless device; and
    - when said remote wireless device is determined to be authentic, provide one of a number of network access levels to said remote wireless device based on access rights associated with said remote wireless device.

14. The article of claim 13, wherein said instructions further operate to:
- when said remote wireless device is determined to not be authentic, provide said default network access level to said remote wireless device.

15. The article of claim 13, wherein:
said default network access level provides at least one of the following: Internet access only, intranet access only, Internet and intranet access only, access to a neighbor wireless access point only, and denied access.

16. The article of claim 13, wherein:
said default network access level provides access at less than a maximum possible speed.

17. The article of claim 13, wherein:
said default network access level has a lower priority on a network medium than other network access levels.

* * * * *